United States Patent
Nakamura (10) Patent No.: US 7,408,628 B2
(45) Date of Patent: Aug. 5, 2008

(54) RADAR APPARATUS

(75) Inventor: Mitsuo Nakamura, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/818,256

(22) Filed: Jun. 13, 2007

(65) Prior Publication Data

US 2007/0291249 A1    Dec. 20, 2007

(30) Foreign Application Priority Data

Jun. 19, 2006    (JP)    ............... 2006-169116

(51) Int. Cl.
*G01C 3/08*    (2006.01)
(52) U.S. Cl. .................................. 356/5.01
(58) Field of Classification Search ....... 356/3.01–3.15, 356/4.01–4.1, 5.01–5.15, 6–22, 139.01–139.1
See application file for complete search history.

(56) References Cited

U.S. PATENT DOCUMENTS 3,764,213 A * 10/1973 O'Meara ................... 356/5.1
5,805,527 A *  9/1998 Hoashi et al. .............. 367/99

2004/0169840 A1  9/2004 Hoashi et al.

FOREIGN PATENT DOCUMENTS

JP        09-236661        9/1997
JP        2004-177350      6/2004

* cited by examiner

*Primary Examiner*—Thomas H. Tarcza
*Assistant Examiner*—Luke D Ratcliffe
(74) *Attorney, Agent, or Firm*—Harness, Dickey & Pierce, P.L.C.

(57) ABSTRACT

The radar apparatus includes a laser light emitting section successively emitting laser lights, a reflection light detecting section receiving, as reflection lights, the laser lights reflected from an object, and generating light reception signals containing reflection signals respectively derived from the reflection lights and having signal levels depending on intensities of the reflection lights, an integrating section generating an integrated signal by integrating the light reception signals, the integrated signal containing the reflection signals being integrated, a phase shifted signal generating section generating a phase shifted signal by delaying the integrated signal by a predetermined time, a differential signal calculating section calculating, as a differential signal, a difference between the integrated signal and the phase-shifted signal, and a detector section detecting the object on the basis of a peak waveform of the differential signal caused by a rising edge of the reflection signals being integrated.

9 Claims, 10 Drawing Sheets

FIG. 3A

SCAN NUMBER (BEAM NUMBER)

ADDITION OF FOUR LIGHT RECEPTION SIGNALS CORRESPONDING TO FOUR BEAMS ADJOINING ON THE SAME SCANNING LINE

RADAR APPARATUS

FIG. 3B

A/D CONVERSION SAMPLING INTERVAL

SCAN NUMBER
N+1
N+2
N+3
N+4

ADDITION

TIME

RADAR APPARATUS

CROSS-REFERENCE TO RELATED APPLICATION

This application is related to Japanese Patent Application No. 2006-169116 filed on Jun. 19, 2006, the contents of which are hereby incorporated by reference.

BACKGROUND OF THE INVENTION

1. Field of the Invention

The present invention relates to a radar apparatus.

2. Description of Related Art

There is known a radar apparatus configured to transmit a laser light, receive the laser light reflected from a reflecting object, and determines a distance to the reflecting object on the basis of a time between a moment of transmission of the laser light and a moment of reception of the laser light. For example, refer to Japanese Patent Application Laid-open No. 9-236661.

In order to accurately determine a reception time at which the laser light is received, such a radar apparatus includes a signal processing circuit operating to detect a time width during which a reflection signal having a signal level depending on the received laser light exceeds a predetermined threshold, and compensate for an error in the reception time depending on the intensity of the received laser light. The reason why such a compensation is performed is that the reflection signal originating from the received laser light has characteristics that it rises sharply, and falls slowly, and that the rising edge slope and the falling edge slope varies depending on the intensity of the received laser light. If a time at which the reflection signal exceeds the predetermined threshold is simply determined as the reception time of the reflected laser light, the reception time thus determined varies depending on the intensity of the received laser light.

Accordingly, in the conventional radar apparatus as described above, a mid-time between a time at which the reflection signal exceeds the predetermined threshold and a time at which the reflection signal falls below the predetermined threshold is calculated, and a correction time by which the calculated mid-time is corrected is calculated on the basis of the intensity of the received light. More specifically, the correction time is determined by referring to a graph showing a correspondence relation between the correction time and the time width during which the reflection signal exceeds the predetermined threshold. This correspondence relation is obtained in advance through experiment or simulation. The mid-time is subtracted by the correction time, and then determined as the reception time of the reflected laser light at which the reflection signal is largely at its peak.

It is also known as disclosed, for example, in Japanese Patent Application Laid-open No. 2004-177350 to improve the detection sensitivity of a radar apparatus of the type described above, in which a laser light is emitted by a predetermined number of times repeatedly for a given emission area, and a plurality of light reception signals each containing a reflection signal resulting from this multiple emission of the laser light are integrated in order to increase the intensity of the reflection signal corresponding to the laser light reflected from a reflecting object.

In such a radar apparatus, if a laser light reflected from a reflecting object having a very large intensity is received, which may occur in a case where the light reflecting object is in the close vicinity of the radar apparatus, or the light reflecting object has a very high reflectivity for the laser light, the signal level of the reflection signal produced corresponding to the received laser light may have a signal level beyond the level which signal processing circuits included in the radar apparatus can deal with. As a result, the reflection signal is saturated, and its waveform is deformed.

Especially, in the case where a plurality of light reception signals are integrated to improve the detection sensitivity, the above problem of the signal saturation and the waveform deformation can easily occur.

If there occurs the saturation and deformation of the reflection signal, it becomes difficult to accurately determine the reception time of the laser light even when the correction as disclosed in Patent Application Laid-open No. 9-236661 is performed.

Incidentally, the radar apparatus disclosed in Japanese Patent Application Laid-open No. 2004-177350 in which the light reception signals containing the reflection signals are integrated to improve the detection sensitivity is configured to eliminate background noise from the integrated signal in order to further improve the detection sensitivity. In more detail, in this radar apparatus, during a period in which a polygon mirror having a plurality of reflecting surfaces for reflecting a laser light generated by a laser diode is in a state where a switching of the reflecting surfaces is on its way, a laser light is intentionally emitted toward outside a target emission area, and background noise is calculated on the basis of a light reception signal obtained at the time. This makes it possible to calculate background noise containing periodic noise components due to a clock pulse of a CPU included in the radar apparatus, and electromagnetic noise due to generation of the laser light. By eliminating the background noise from the integrated signal, it becomes possible to increase S/N to thereby further improve the detection sensitivity of the radar apparatus.

The background noise needs to be calculated in a specific timing as explained above, and stored in a memory such as RAM each time it is calculated, because the background noise varies with time due to secular change of the characteristics of the radar apparatus, and change of thermal environment. Accordingly, the conventional radar apparatus of the type as disclosed in Japanese Patent Application Laid-open No. 2004-177350 has a problem in that the load of the CPU becomes very large, because the CPU has to calculate the background periodically.

SUMMARY OF THE INVENTION

The present invention provides a radar apparatus comprising:

a laser light emitting section successively emitting laser lights;

a reflection light detecting section receiving, as reflection lights, the laser lights emitted by the laser light emitting section and reflected from an object, and generating light reception signals containing reflection signals respectively derived from the reflection lights and having signal levels depending on intensities of the reflection lights;

an integrating section generating an integrated signal by integrating the light reception signals, the integrated signal containing the reflection signals being integrated;

a phase shifted signal generating section generating a phase shifted signal by delaying the integrated signal by a predetermined time;

a differential signal calculating section calculating, as a differential signal, a difference between the integrated signal and the phase-shifted signal; and a detector section detecting the object on the basis of a peak waveform of the differential signal caused by a rising edge of the reflection signals being integrated.

The present invention further provides a radar apparatus comprising:

a laser light emitting section emitting a laser light;

a reflection light detecting section receiving, as a reflection light, the laser light emitted by the laser light emitting section and reflected from an object, and generating a light reception signal containing a reflection signal derived from the reflection light and having a signal level depending on an intensity of the reflection light;

a differential signal calculating section calculating, as a differential signal, a difference between a first signal derived from the light reception signal and being in phase with the light reception signal and a second signal derived the light reception signal and being out of phase with the light reception signal; and a detector section detecting the object on the basis of a peak waveform of the differential signal caused by a rising edge of the reflection signal.

According to the present invention, it becomes possible for a radar apparatus of the type integrating a plurality of light reception signals to improve its detection sensitivity to be able to accurately determine a peak of a reflection signal contained in the integrated signal, which corresponds to a distance of an object to be detected, even when the reflection signal is saturated.

According to the present invention, it also becomes possible to eliminate background noise from a light reception signal to improve detection sensitivity by performing a simple process.

The predetermined time may be set at such a value that a position on a time axis of a center axis of the peak waveform of the differential signal coincides with a position on the time axis of a time point corresponding to a distance to the object.

The detector section may calculate an elapsed time between a moment of emission of the laser light and a midpoint between a rising intersection and a falling intersection between the peak waveform and a predetermined threshold line, and determine the distance to the object on the basis of the calculated elapsed time.

The radar apparatus of the present invention may further comprise a saturation judging section judging whether or not a peak waveform of the integrated signal is saturated or not, and the detector section may be configured to detect the object on the basis of the peak waveform of the differential signal when the saturation judging section judges that the peak waveform of the integrated signal is saturated, and detect the object on the basis of the peak waveform of the differential signal when the saturation judging section judges that the peak waveform of the integrated signal is not saturated.

Other advantages and features of the invention will become apparent from the following description including the drawings and claims.

PREFERRED EMBODIMENTS OF THE INVENTION

Figure 1:
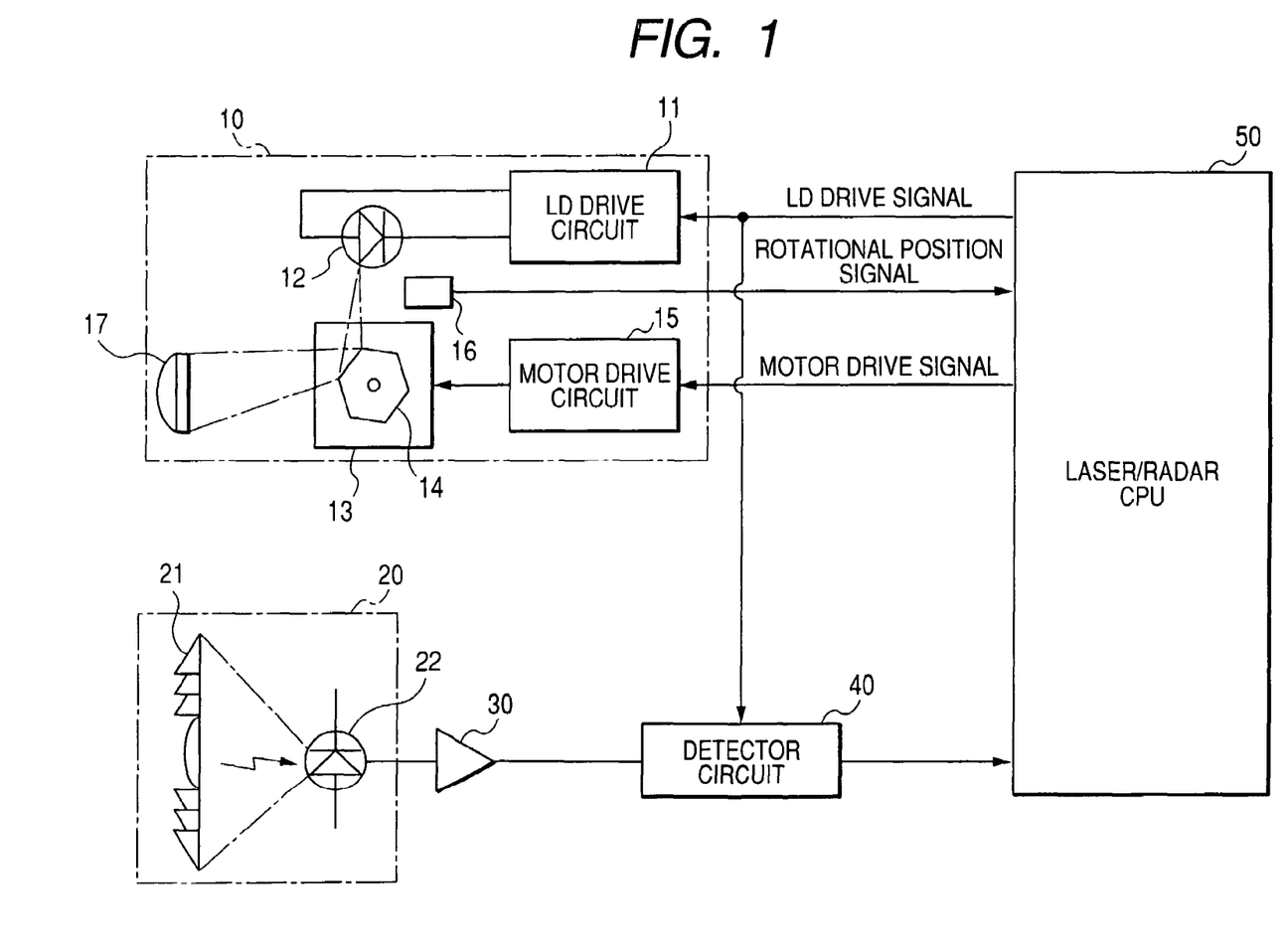
FIG. 1 is a diagram showing an overall structure of a radar apparatus according to an embodiment of the invention, which is mounted on a vehicle.

FIG. 1 is a diagram showing an overall structure of a radar apparatus according to an embodiment of the invention, which is mounted on a vehicle. As shown in this figure, this radar apparatus includes a light emitting section 10, a light receiving section 20, a detector circuit 40, and a laser/radar CPU 50. The light emitting section 10 and the light receiving section 20 are mounted on a front part of the vehicle to detect an object existing ahead of the vehicle.

The light emitting section 10 includes a semiconductor laser diode (referred to simply as a laser diode hereinafter) 12 which emits a pulsed laser light through a scanner 13 and a light emission lens 17. The laser diode 12, which is connected to the CPU 50 through a laser diode drive circuit 11, emits the pulsed laser light when it is applied with an LD drive signal (laser diode drive signal) outputted from the CPU 50.

The scanner 13 is provided with a polygon mirror 14 arranged so as to be rotatable along a vertical axis. The polygon mirror 14 is rotated by a motor (not shown) driven by a motor drive circuit 15, each time a motor drive signal is supplied from the CPU 50 to the motor drive circuit 15. The rotational position of the motor is detected by a motor rotational position sensor 16, and is outputted to the CPU 50.

The polygon mirror 14 has six mirrors (reflecting surfaces) having different lean angles. Accordingly, by causing the laser diode 12 to emit the pulsed laser light intermittently when the polygon mirror 14 is being rotated, it becomes possible to sweep the laser light in a discontinuous manner within a predetermined angle range in a vehicle-width direction and a vehicle-height direction.

Figure 3A:
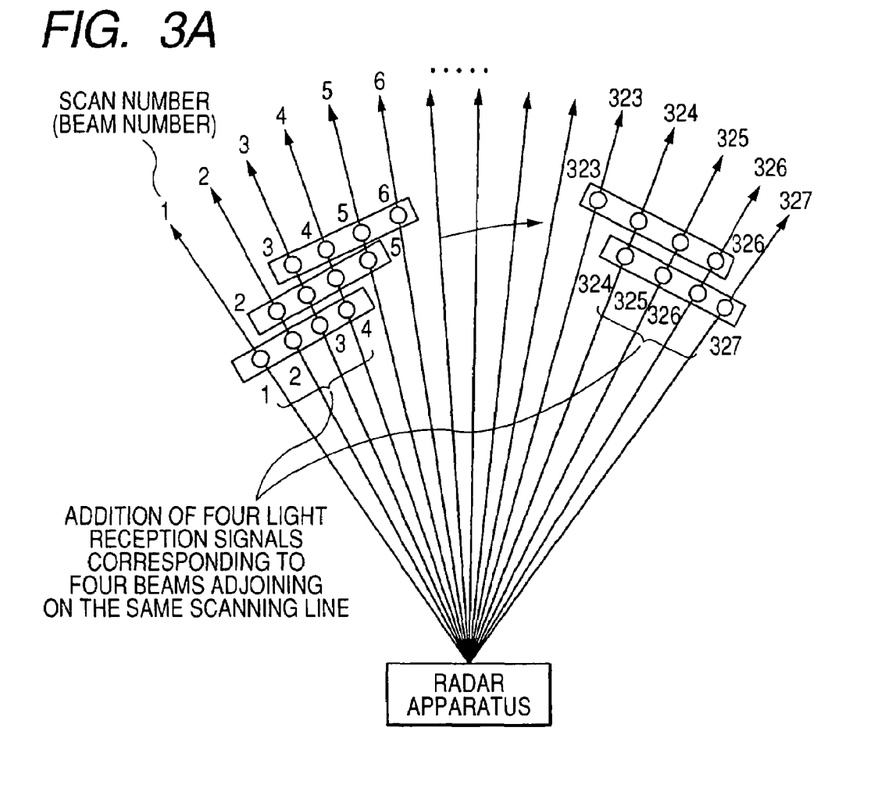
FIG. 3A is a diagram schematically showing a range of light reception signals to be integrated in a case where the number of the light reception signals to be integrated is set at 4.

Here, one example of a laser light emission area is explained. The laser light is emitted such that when the emission direction thereof is along a Z-axis, the laser light scans an X-Y plane parallel to the Z-axis. In this embodiment, a Y-axis along the vehicle-height direction is defined as a reference direction, and an X-axis along the vehicle-width direction is defined as a scanning direction. As shown in FIG. 3A, the laser light is emitted with the emission axis thereof being shifted successively by a predetermined angle in the X-axis, so that the laser light is applied to 327 different points on the same scanning line along the X-axis. The 327 times application of the laser light along the X-axis is repeated 6 times with the emission axis being successively shifted in the Y-axis. Accordingly, 327 times application of the laser light is performed for each of the first to sixth scanning lines.

The light receiving section 20 includes a light receiving lens 21 for receiving the laser light reflected from an object (not shown) and guiding it to a light receiving device (photo diode) 22. The light receiving device 22 generates, upon receiving the reflected laser light, a voltage signal having a voltage level depending on the intensity of the received laser light as a reflection signal. It should be noted that the light receiving device 22 generates a light reception signal (voltage signal) due to ambient light even when no laser light is received. Upon receiving the laser light, the light receiving device 22 generates the light reception signal containing the reflection signal. This light reception signal is amplified by an amplifier 30, and then supplied to the detector circuit 40.

The detector circuit 40 measures a time between emission and reception of the laser light, and supplies it to the laser/radar CPU 50. The laser/radar CPU 50 calculates the distance to the object on the basis of the measured time supplied from the detector circuit 40, and supplies an alarm device and a control device of an adaptive cruise control system (not shown) with the calculated distance as a measurement result together with scan angles OX, OY of the laser light used for the distance calculation.

Figure 2:
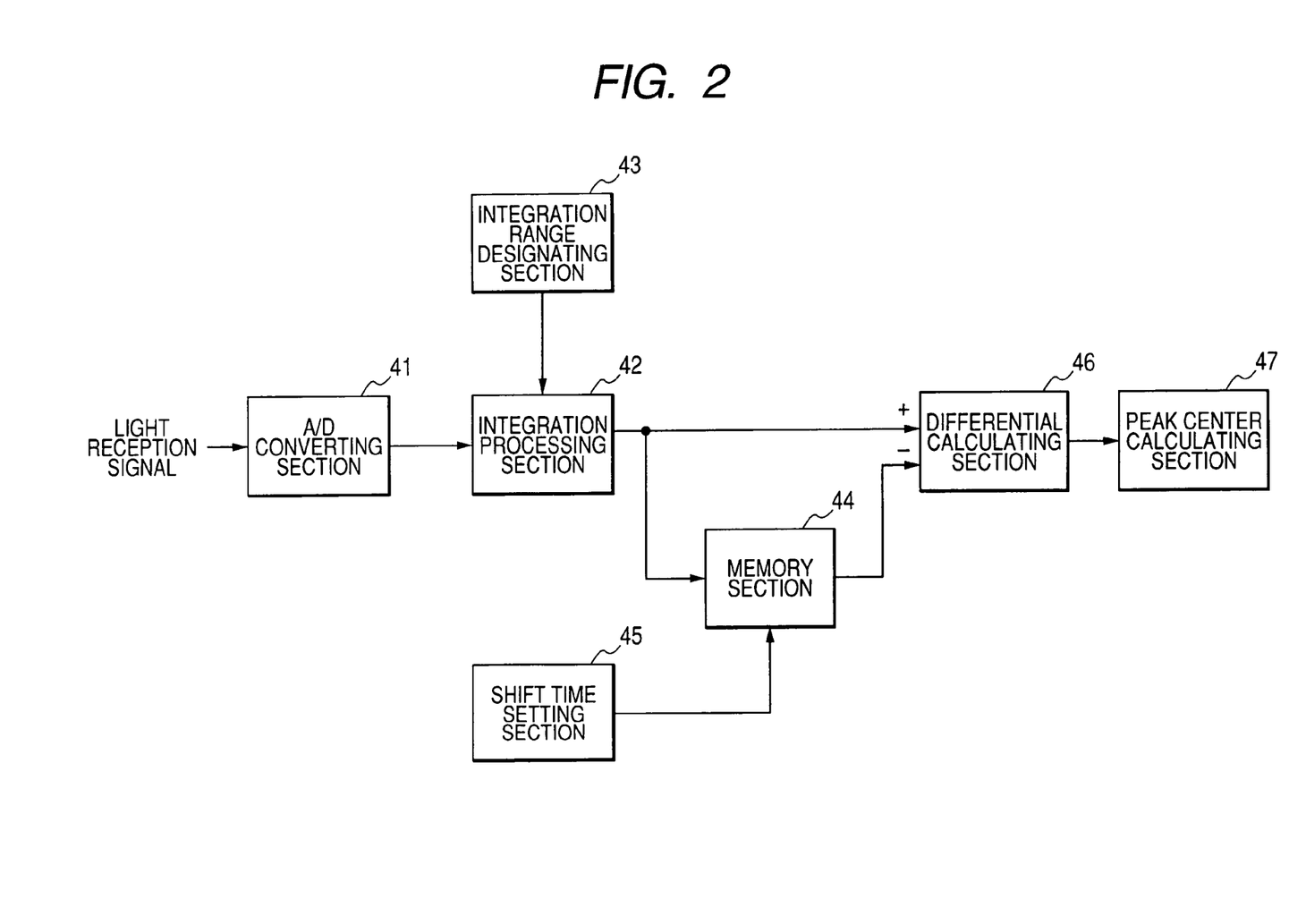
FIG. 2 is a diagram showing a structure of a detector circuit included in the radar apparatus shown in FIG. 1.

Next, the structure and the operation of the detector circuit 40 are explained in detail. As shown in FIG. 2, the detector circuit 40 includes an A/D converting section 41, an integration processing section 42, an integration range designating section 43, a shift time setting section 45, a memory section 44, a differential calculating section 46, and a peak center calculating section 47. The light reception signal amplified by the amplifier 30 is inputted to the A/D converting section 41 where it is converted into a digital signal. The light reception signal converted into the digital signal is temporarily stored in the integration processing section 42. Here, the light reception signal to be A/D converted is a signal outputted from the amplifier 30 during a period from when the laser light is emitted to when a predetermined time has elapsed since the emission of the laser light. The A/D converting section 41 divides the light reception signal into N time sections each having a predetermined time length (25 ns, for example), calculates an average of the values which the light reception signal respectively takes in the N time sections, and converts the calculated average into a digital value.

The integration range designating section 43 designates, as a range of the light reception signals to be integrated, a predetermined number of the light reception signals stored in the integration processing section 42, which correspond to a predetermined number of the laser lights successively emitted along the X-axis. The integration processing section 42 integrates the light reception signals included in the designated range to form an integrated signal. Further details about the range of the light reception signals designated by the integration range designating section 43, and the formation of the integrated signal are explained below.

FIG. 3A schematically shows a range of the light reception signals to be integrated by use of beam numbers (scan numbers for the light reception signals) assigned to the laser lights successively emitted at a certain angular intervals along the X-axis in a case where the number of the light reception signals to be integrated is set at 4. In FIG. 3A, only one scanning line of the laser lights is shown to facilitate explanation.

Here, it is assumed that a traveling-ahead vehicle to be detected is provided with a reflector at a rear part thereof, and vehicle body thereof has a comparatively high reflectivity, although not so high as that of the reflector. In this assumption, since the intensity of the reflected laser light is sufficiently high, the traveling-ahead vehicle can be detected from only one light reception signal resulting from one reflected laser light. However, if mud or snow adheres to the rear part of the vehicle, the intensity of the laser light reflected from the vehicle is lowered. In this case, there arises a possibility that the traveling-ahead vehicle cannot be detected from an individual light reception signal.

Accordingly, in this embodiment, a plurality of light reception signals are integrated to enhance in effect the intensity of the reflected laser light. The integration range designating section 43 designates a range of light reception signals to be integrated. As shown in FIG. 3A, the integration range designating section 43 designates a predetermined number of light reception signals corresponding to the laser lights adjoining on the same scanning line as the light reception signals to be integrated. More specifically, the integration range designating section 43 designates the four light reception signals numbered from 1 to 4 as a first integration range, and next designates the four light reception signals numbered from 2 to 5 as a second integration range. In this manner, the integration range designating section 43 successively designates the integration ranges each including the four adjoining light reception signals.

Figure 3B:
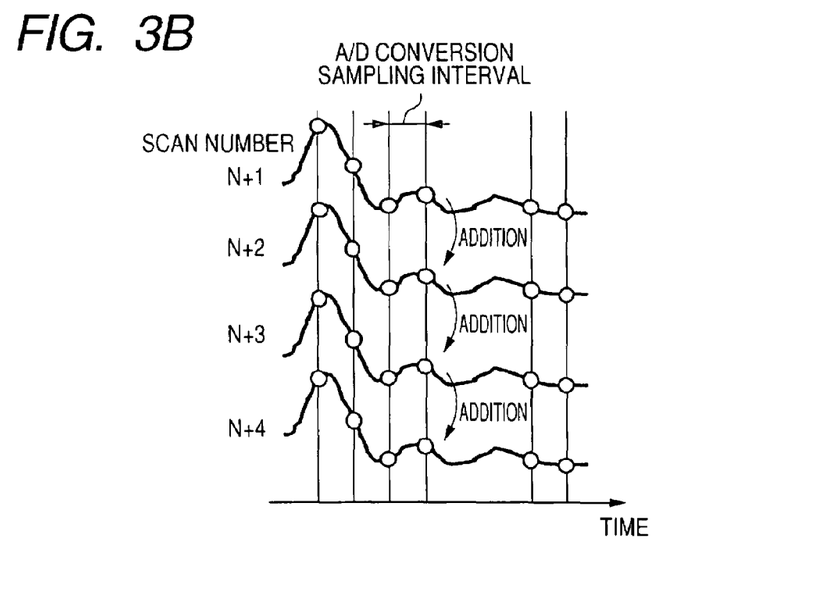
FIG. 3B is a diagram explaining a process for integrating a plurality of the light reception signals.

As the integration range designating section 43 successively designates the integration ranges, the integration processing section 42 successively integrates the light reception signals for each integrating range. As shown in FIG. 3B, the integration performed by the integration processing section 42 is a process for summing digital values of a plurality of the light reception signals designated to be integrated for each corresponding time point. By integrating a plurality of light reception signals, it is possible to increase S/N of the reflection signal for the reason explained below.

Figure 4A:
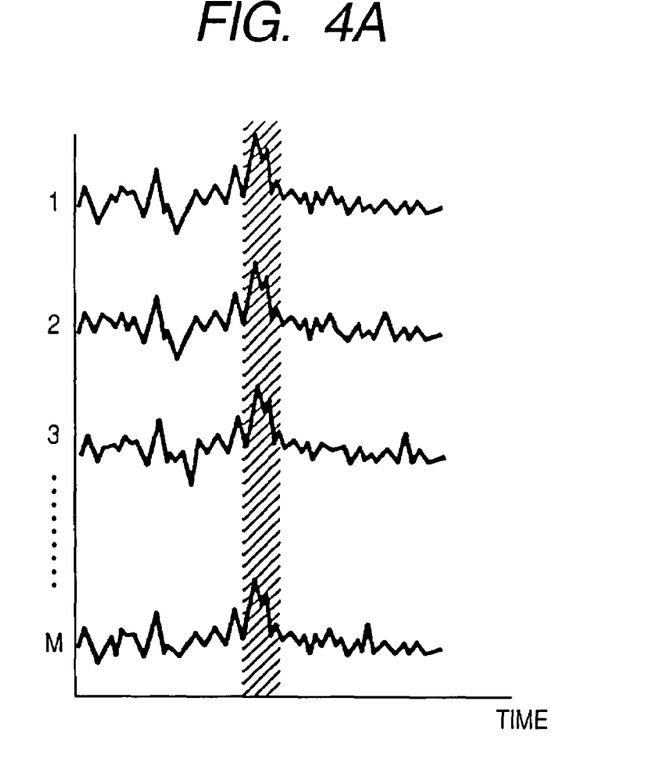
FIG. 4A is a diagram showing waveforms of M light reception signals placed side by side along the same time axis.
Figure 4B:
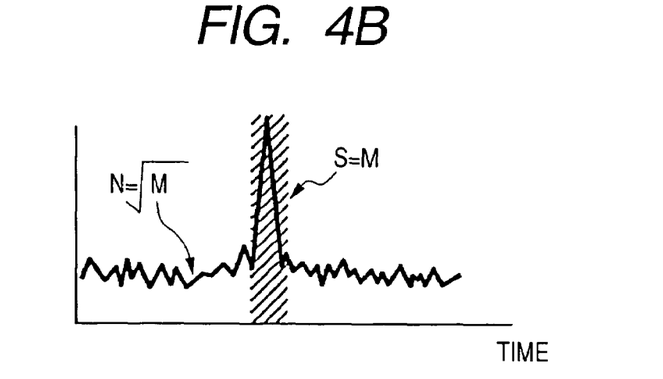
FIG. 4B is a diagram showing a waveform of an integrated signal formed by integrating the M light reception signals.

As shown in FIG. 4A, when M light reception signals contain reflection signals due to an identical reflecting object, these reflection signals appear at the same timing when the same time has elapsed since the emission of the laser light (shaded areas in FIG. 4A). Accordingly, by integrating the M light reception signals, the reflection signal can be amplified by a factor of M. On the other hand, background noise contained in the M light reception signals is amplified only by a factor of root M by integrating these light reception signals, because the background noise is a random noise resulting from ambient light. Hence, by integrating a plurality of the light reception signals, it becomes possible to increase S/N (the ratio of the reflection signal to the background noise). This makes it possible to detect the reflecting object even when the reflection signal contained in the individual light reception signal is weak and is hard to distinguish from the background noise.

As explained above, the integration range designating section 43 successively shifts the position of the integration range by an angle corresponding to one light reception signal. This makes it possible to minimize lowering of the detection resolution of the integrated signal while performing the integration.

Although the number of the light reception signals designated to be integrated is 4 in this embodiment, it is a matter of course that it should be determined in accordance with the size of an object to be detected, angle intervals of the laser lights successively emitted, and a maximum detection distance.

The memory section 44 stores the integrated signal outputted from the integration processing section 42, and outputs the stored integrated signal when a shift time set by the shift time setting section 45 has elapsed since storing of the integrated signal. Accordingly, the differential calculating section 46 receives an integrated signal from the integration processing section 42, and the same integrated signal delayed by a phase corresponding to the shift time as a phase-shifted signal. The differential calculating section 46 calculates a difference between these signals as a differential signal. The peak center calculating section 47 calculates a peak center of a peak waveform of the differential signal, as a time point corresponding to the position of the reflecting object.

Next, the reason why the distance to the reflecting object is determined on the basis of the peak waveform of the differential signal between the integrated signal and the phase shifted signal is explained.

As explained above, in a case where a plurality of light reception signals containing reflection signals resulting from the laser lights reflected from an identical reflecting object are integrated to improve detection sensitivity, since the reflection signal is strongly amplified, saturation of the reflection signal easily occurs. Here, the saturation of the reflection signal means that the signal level of the reflection signal becomes large beyond an allowable range which the detector circuit 40 can deal with, and fixed to a maximum value of this allowable range.

If the reflection signal is saturated, since its waveform is deformed, it becomes difficult to accurately determine its peak value, and accordingly, it becomes difficult to determine a reception time at which the laser light reflected from the object is received. To cope with this, this embodiment is configured to calculate the differential signal as explained above, to enable obtaining the peak waveform which peaks at the time point corresponding to the position of the object even if the reflection signal is deformed to a trapezoidal shape.

Figure 5A:
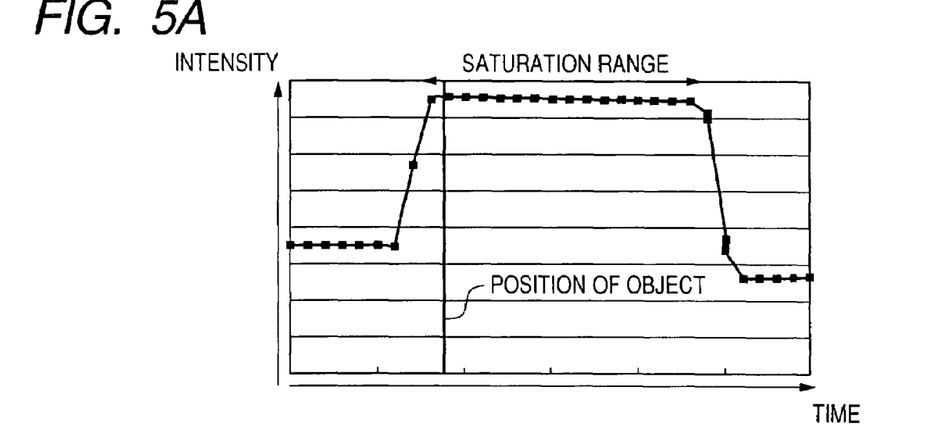
FIGS. 5A, 5B, 5C are diagrams each showing an example of a waveform of the integrated signal having been saturated in which a time point corresponding to a position of a reflecting object is marked.
Figure 5B:
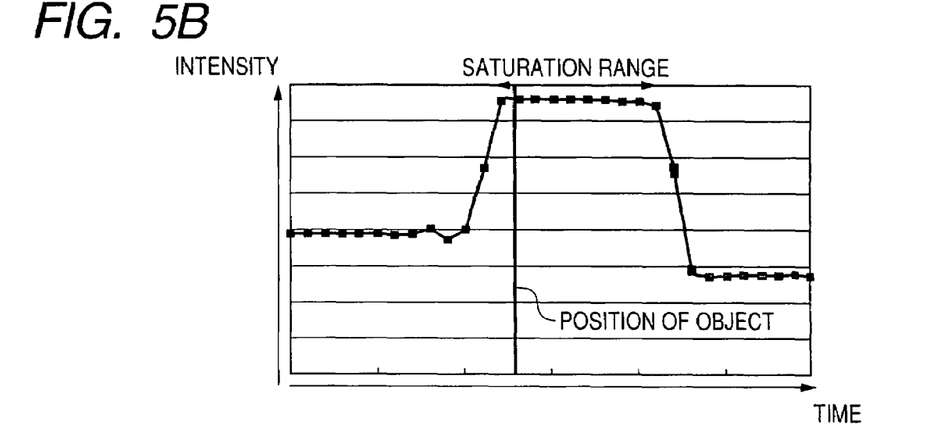
Figure 5C:
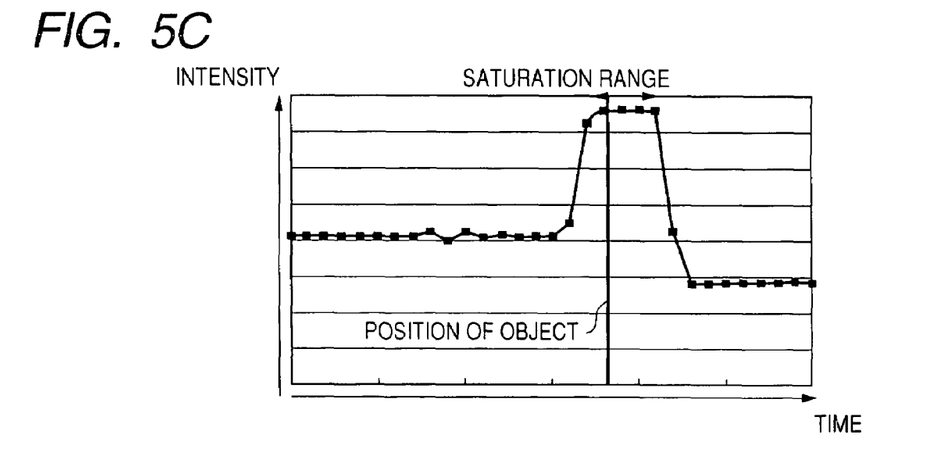

FIGS. 5A, 5B, 5C are diagrams each showing an example of a waveform of the saturated integrated signal in which the time point corresponding to the position of the object reflecting the laser light is marked. In each of these figures, the black rectangular marks represent sampling time points at which reflection signals are A/D-converted, and the A/D conversion results are integrated. The distance to the object is made longer in order from FIG. 5A to FIG. 5C.

It can be seen from FIG. 5A to FIG. 5C that as the distance to the object becomes small, the peak value of the reflection signal contained in the integrated signal becomes large, and accordingly, the period during which the reflection signal is saturated is widened. Also it can be seen from FIG. 5A to FIG. 5C that the waveforms of the saturated reflection signal rise at substantially the same angle irrespective of difference in the distance to the object, and that a time between a time point at which this waveform rises and the time point corresponding to the position of the object is substantially constant.

Accordingly, if a peak waveform of a triangle-like shape symmetrical with respect to the time point corresponding to the position of the object (distance to the object) can be extracted from the waveform of a trapezoid shape of the saturated signal, it is possible to determine the time point corresponding to the position of the object as explained below.

The following is an explanation of a differential process for extracting the peak waveform symmetrical with respect to the time point corresponding to the position of the object from the waveform of a trapezoidal shape of the saturated reflection signal.

Here, it is assumed that the integrated signal containing the saturated reflection signal is represented by a function of f(t), where t is a discrete time elapsed since the emission of the laser light, which is shown as black rectangular marks representing sampling time points in FIGS. 5A, 5B, 5C. The intervals of the discrete time is determined depending on the sampling frequency of the A/D conversion.

When $\Delta d$ is an integral multiple of the A/D sampling interval of the A/D conversion (=1/sampling frequency), the function of $f(t-\Delta d)$ represents the phase shifted signal which is delayed by $\Delta d$ from the integrated signal. Accordingly, the differential signal $\Delta f$ is given by the following expression (1)

$$\Delta f = f(t) - f(t - \Delta d) \quad (1)$$

That is, the differential signal $\Delta f$ can be obtained by subtracting, from the waveform of the integrated signal, the waveform of the phase shifted signal delayed by a certain time from this integrated signal and having the same waveform as this integrated signal. This differential process enables to detect the rising edge and the falling edge of the reflection signal having a trapezoidal shape contained in the integrated signal as a rising peak at a positive value and a falling peak at a negative value. A plateau section of the trapezoidal waveform becomes 0 level by the differential process.

Figure 6:
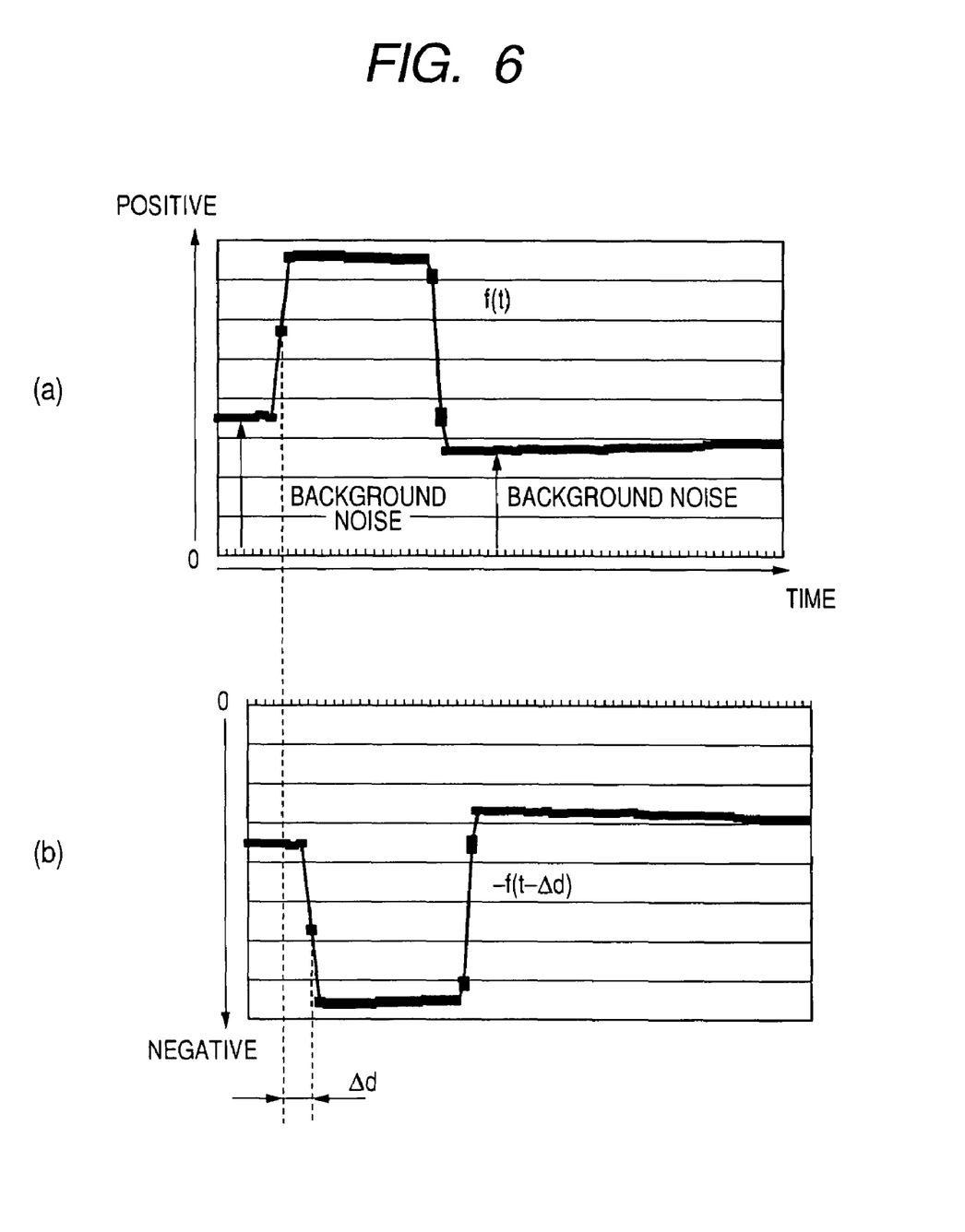
FIG. 6 is a diagram showing a waveform of the integrated signal to be subjected to a differential process and a waveform of the integrated signal which has been shifted by an integral multiple of an A/D sampling interval, and inverted in polarity.
Figure 7A:
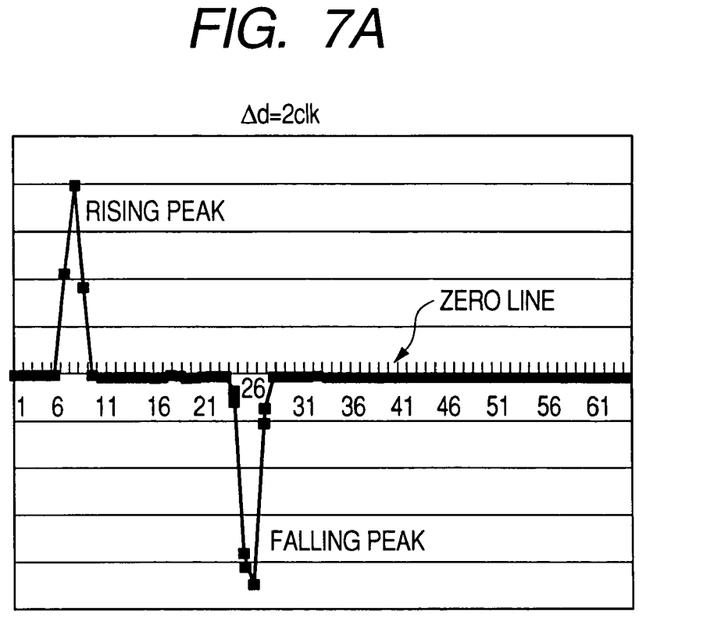
FIG. 7A is a diagram showing a waveform of a differential signal when a shift time Δd is twice the A/D sampling interval clk.
Figure 7B:
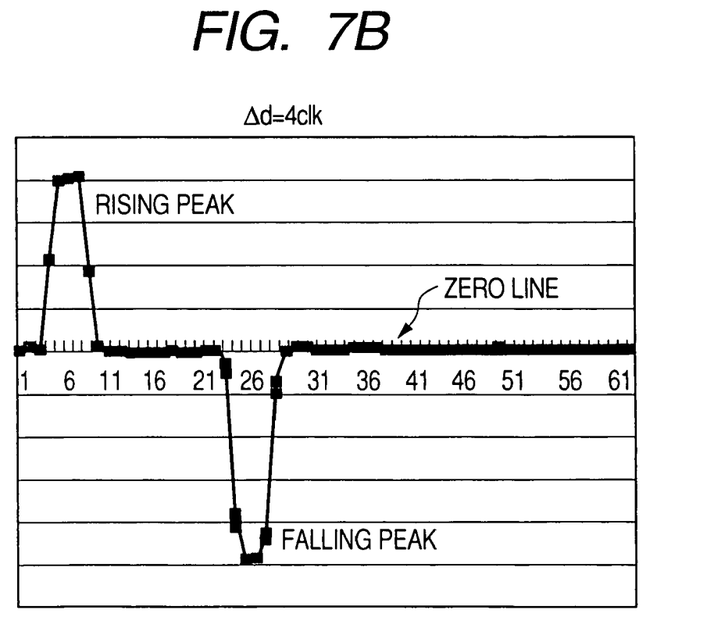
FIG. 7B is a diagram showing a waveform of the differential signal when the shift time Δd is four times the A/D sampling interval.

The differential process is explained in further detail below. A waveform of the integrated signal to be subjected to the differential process, which corresponds to the first term of the right-hand side of the expression (1) is shown in (a) of FIG. 6. A waveform of the integrated signal which has been shifted by an integral multiple of the A/D sampling interval, and inverted in polarity is shown in (b) of FIG. 6. Expression (1) is performed by adding the waveforms shown in (a) and (b) of FIG. 6. FIGS. 7A, 7B show the results of the differential process.

FIG. 7A is a diagram showing a waveform of the differential signal when the shift time $\Delta d$ in expression (1) is twice the A/D sampling interval clk (Ad=2clk), and FIG. 7B is a diagram showing a waveform of the differential signal when the shift time $\Delta d$ in expression (1) is four times the A/D sampling interval clk (Ad=4clk).

As shown in FIGS. 7A, 7B, the rising peak waveform and the falling peak waveform of the differential signal are respectively caused by the rising edge and the falling edge of the saturated reflection signal having a trapezoidal shape contained in the integrated signal. It can be seen from FIGS. 7A, 7B that the rising peak waveform appearing in the differential signal is largely symmetrical in both cases of FIGS. 7A, and 7B.

However, the position of the axis of symmetry is different between the case of FIG. 7A and the case of FIG. 7B.

Also, as shown in FIGS. 7A, 7B, the differential signal is at around a zero level in a part other than the rising peak and the falling peak. That is because the part of the integrated signal other than the rising edge and the falling edge is roughly constant, and accordingly this part is eliminated by the differential process. As understood from the above, the differential process enables not only extraction of the peak waveforms, but also elimination of the background noise.

If the position of the axis of symmetry of the rising peak waveform of the differential signal coincides with the time point corresponding to the position of the object, the time point corresponding to the position of the reflecting object can be easily determined from the rising peak waveform of the differential signal. However, the position of the axis of symmetry of the rising peak waveform of the differential signal varies depending on the shift time $\Delta d$. Accordingly, it is necessary to set the shift time $\Delta d$ at such a value that position of the symmetry of the rising peak waveform coincides with the time point corresponding to the position of the object.

In the case of FIG. 7A, the axis of symmetry of the rising peak waveform is out of alignment with the time point corresponding to the position of the object. On the other hand, in the case of FIG. 7B, it roughly coincides with the time point correspond to the position of the object.

Figure 8A:
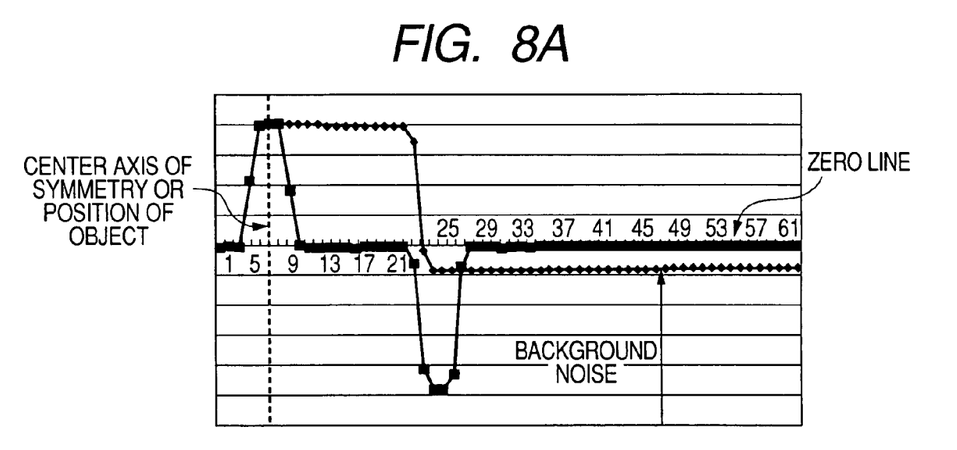
FIGS. 8A, 8B, and 8C are diagrams for explaining the relationship between a center axis of symmetry of a rising peak waveform of the differential signal and the time point corresponding to the position of the reflecting object.
Figure 8B:
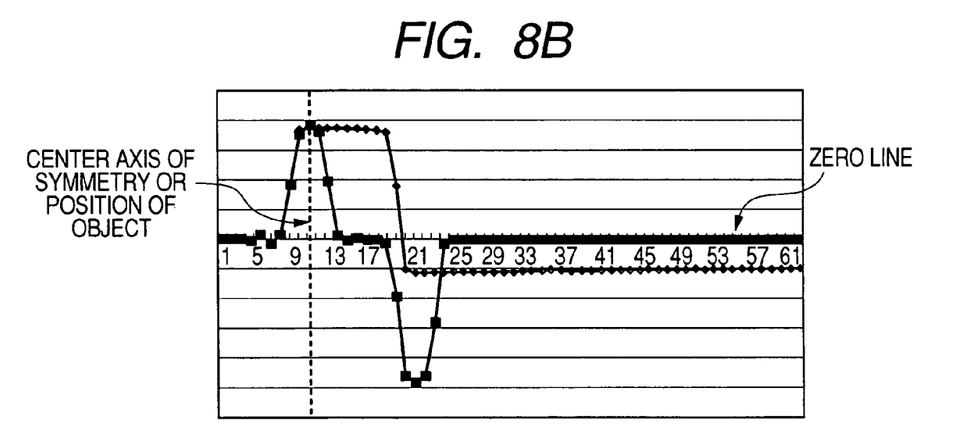
Figure 8C:
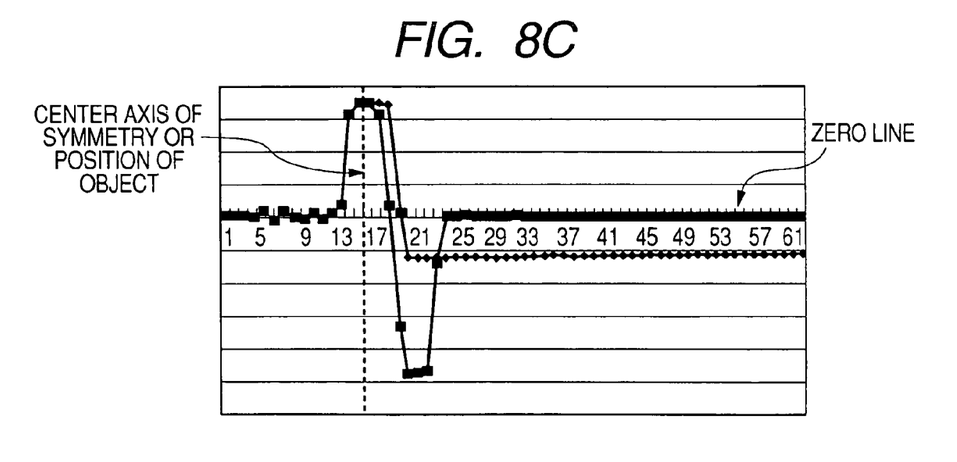

FIGS. 8A, 8B, and 8C are diagrams for explaining the relationship between the axis of symmetry of the rising peak waveform of the differential signal and the time point correspond to the position of the object when the shift time $\Delta d$ is set to four times the value of the A/D sampling interval clk. FIG. 8A shows a case where the integrated signal shown in FIG. 5A is used to calculate the differential signal, FIG. 8B shows a case where the integrated signal shown in FIG. 5B is used to calculate the differential signal, and FIG. 8C shows a case where the integrated signal shown in FIG. 5C is used to calculate the differential signal.

As explained above, the waveform of the integrated signal contains the background noise, while on the other hand, the waveform of the differential signal does not contain the background noise, because it has been eliminated by the differential process. Accordingly, the waveform of the differential signal has such a shape that the peak waveforms are carried by the zero line (zero level). It should be noted that actually, the zero level of the integrated signal is different from that of the differential signal, the integrated signal and the differential signal are overlapped in FIGS. 8A, 8B, 8C to facilitate explanation and understanding.

It can be seen from FIGS. 8A, 8B, 8C that if the shift time $\Delta d$ is set to four times the value of the A/D conversion sampling interval clk, it becomes possible to obtain the peak waveform having the axis of symmetry the position of which coincides with the time point corresponding to the position of the object irrespective of the distance to the object.

Figure 9:
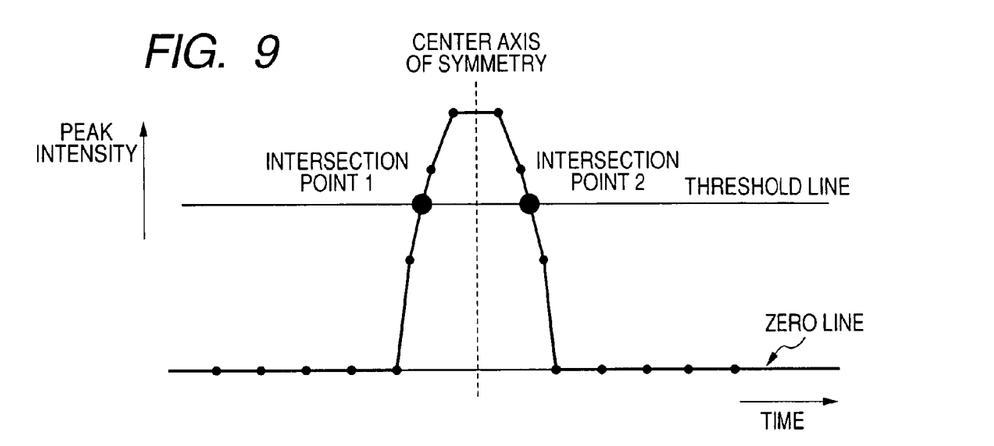
FIG. 9 is a diagram for explaining a method for calculating a time point corresponding to the center axis of the peak waveform.

As shown in FIG. 9, since the peak waveform has symmetry, the time point corresponding to the position of the object can be calculated as a position of a midpoint between two intersection points between a predetermined threshold line and the peak waveform. This makes it possible to eliminate the need to perform the correction process as described in afore-explained Japanese Patent Application Laid-open No. 9-236661.

By performing the differential process as described above, it becomes possible to obtain the peak waveform which peaks at the time point corresponding to the position of the object even if the reflection signal is saturated to trapezoidal shape.

In this embodiment, the shift time $\Delta d$ is set to four times the value of the A/D conversion sampling interval clk. However, it should be noted that it is merely one example, and the value of the shift time $\Delta d$ has to be determined depending on the characteristics of the light receiving section 20 and the detector circuit 40. Accordingly, it is preferable to measure an elapsed time between a time point at which a saturated reflection signal rises and the time point corresponding to the position of the object to be detected through experiment or simulation in order to set the shift time $\Delta d$ at an optimum value.

In a case where the shift time $\Delta d$ can be set only to integral multiple of the A/D conversion sampling interval, that is, only to discrete values, there are limits in adjusting the position of the axis of symmetry of the peak waveform to the position of the object. Accordingly, it is preferable that the shift time $\Delta d$ can be set to continuous values. If the integration of the light reception signals and calculation of the differential signal are performed on analog basis without A/D converting the light reception signals, the shift time $\Delta d$ can be set continuous values. However, integrating analog signals which occur at different times is difficult in terms of assuring accuracy. Hence, it is preferable to make the A/D conversion sampling interval as short as possible to enable finely adjusting the position of the axis of symmetry of the peak waveform.

It is a matter of course that many modifications can be made to the above described embodiment of the invention.

Figure 10A:
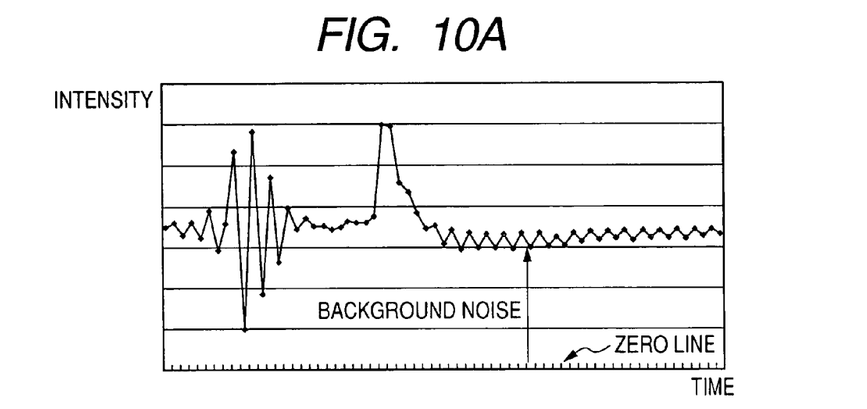
FIGS. 10A, 10B are diagrams for explaining a method for performing the differential process on the light reception signals not integrated.
Figure 10B:
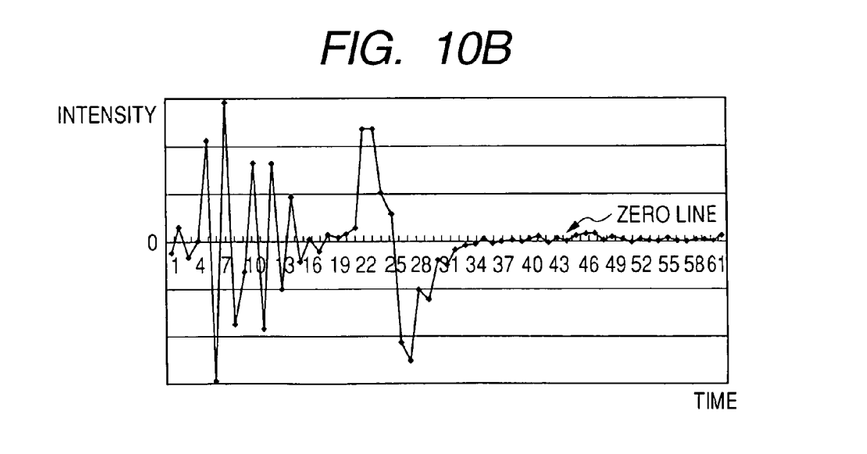

For example, although the differential signal is calculated from the saturated integrated signal formed by integrating a plurality of the light reception signals containing the reflection signals originating from the laser light beams reflected from the identical object, and the phase shifted signal formed by phase-shifting this integrated signal in this embodiment, The differential signal may be calculated from a non-saturated integrated signal, since the differential process provides the effect of eliminating background noise. In this case, a differential signal between an integrated signal not saturated as shown in FIG. 10A (referred to as a first signal) and a second signal formed by phase shifting the first signal is produced. By setting the shift time of the second signal longer than the interval of the peak waveforms of the first signal, it becomes possible that the peak waveform of the first signal is preserved and background noise is eliminated in the second signal as shown in FIG. 10B. It is possible to eliminate the background noise also by subjecting the light reception signals before being integrated to the differential process.

The differential process described above is simpler than the process which the conventional radar apparatus disclosed in Japanese Patent Application Laid-open No. 9-236661 performs periodically at a predetermined timing for measuring background noise, and subtracting the measured background noise from a light reception signal. Accordingly, according to this embodiment, the process load of the detector circuit can be reduced.

Figure 11A:
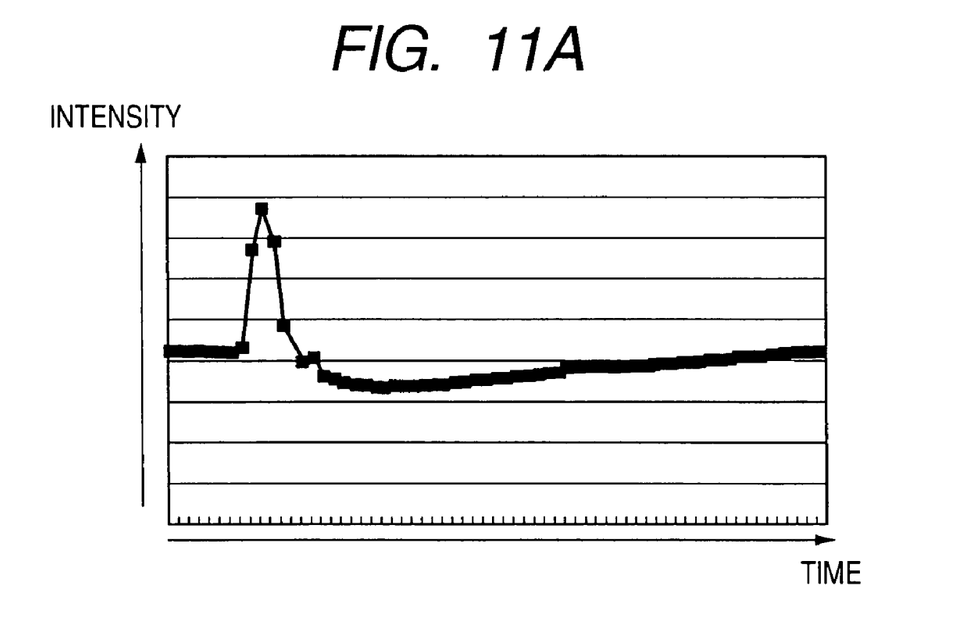
FIGS. 11A, 11B are diagrams for explaining an operation of a variant of the radar apparatus according to the embodiment of the invention.
Figure 11B:
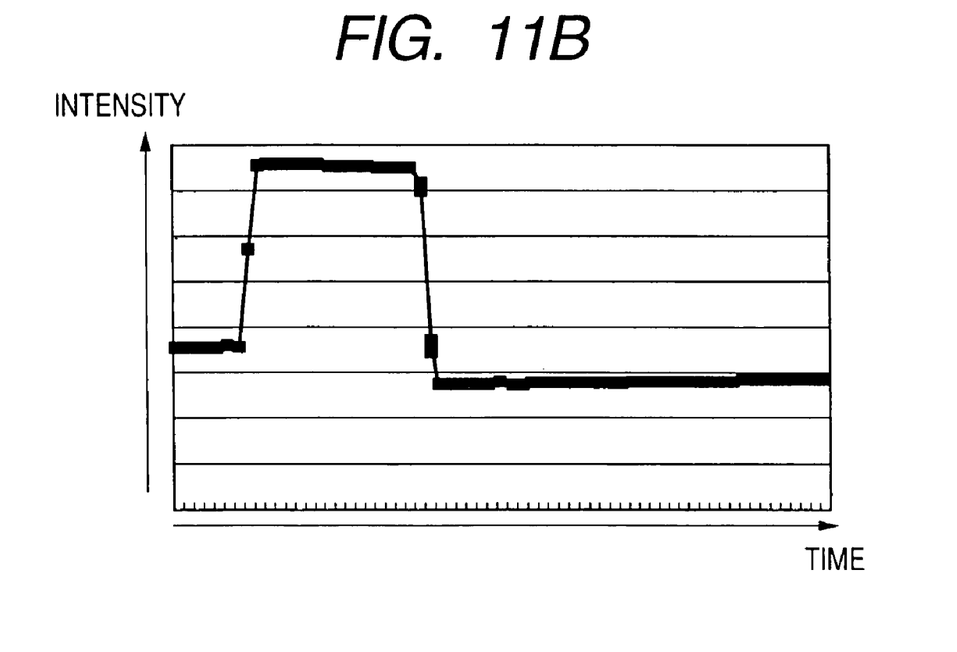

When the intensities of the reflection signals contained in the light reception signals are weak, there may occur a case in which the integrated signal is not saturated as shown in FIG. 11A. In this case, since the peak waveform of the reflection signal contained in the integrated signal is not deformed to a trapezoidal shape, the time point corresponding to the position of the object can be calculated by use of the method described in Japanese Patent Application Laid-open No. 9-236661. On the other hand, when it is deformed to a trapezoidal shape, it is necessary to perform the above described differential process to accurately calculate the time point corresponding to the position of the object.

Accordingly, the detector circuit 40 may be provided with a saturation judging section making a judgment as to whether or not the saturation has occurred on the basis of the intensity of the integrated signal in order to enable that the time point corresponding to the position of the object is calculated in accordance with the above described process of this embodiment when the saturation has occurred, and calculated in accordance with the conventional method when the saturation has not occurred. The differential process may be performed when the saturation has not occurred if it is required to obtain the effect of eliminating background noise. The value of the shift time set when the saturation has not occurred may be different from that set when the saturation has occurred.

Incidentally, at the time of calculating the time point corresponding to the position of the object in accordance with the conventional method, a mid-time between a moment at which the peak waveform of the reflection signal contained in the integrated signal exceeds a predetermined threshold and a moment at which it falls below the predetermined threshold is calculated, and a correction time by which the calculated mid-time is corrected is calculated on the basis of the intensity of the received laser light. By subtracting the correction time from the mid-time, a time at which the reflection signal peaks can be calculated as the reception time of the laser light reflected from the object. The time point corresponding to the position of the object can be determined from a difference between the calculated reception time and the time at which the laser light was emitted.

The radar apparatus of this embodiment is configured to emit a plurality of pulsed laser lights while successively shifting the direction of emission by a predetermined angle in the vehicle-width direction, and form the integrated signal by integrating a predetermined number of light reception signals corresponding to the predetermined number of the laser lights adjoining along the vehicle-width direction.

However, the radar apparatus of the invention may be so configured that the laser/radar CPU 50 outputs the drive signal to the laser diode drive circuit 11 and the motor drive circuit 15 to cause the laser diode 12 emit the laser light multiple times when the polygon mirror 14 is stationary. In this case, the light receiving section 20 receives the laser lights successively emitted in the same direction and reflected from an identical reflecting object, and outputs corresponding light reception signals.

The differential process my be performed on an integrated signal formed by integrating these light reception signals and a phase shifted signal formed by phase-shifting this integrated signal. This configuration makes it possible to accurately detect a reflecting object having a small width such as a motorcycle. In addition, this configuration makes it possible to detect the distance to a vehicle traveling closely ahead.

Incidentally, in this configuration, when the laser diode 12 has emitted the laser light a predetermined number of times in the same direction, the CPU 50 causes the laser diode 12 to stop the laser light emission, and causes the polygon mirror 14 to rotate by a predetermined angle and then to stop. In this state where the polygon mirror is stationary, the CPU 50 again causes the laser diode 12 to emit the laser light the predetermined number of times in another same direction. Through repetition of the above described operation controlled by the CPU 50, it becomes possible to scan a predetermined angle range in the vehicle-width direction and the vehicle-height direction by the laser light in such a manner that the laser light is emitted multiple times in the same direction.

In this embodiment, the shift time Δd is determined to such a value that the position of the axis of symmetry of the rising peak waveform of the differential signal obtained by the differential process coincides with the time point corresponding to the position of the object. However, when the relationship between the position of the axis of symmetry of the rising peak waveform of the differential signal obtained by the differential process and the time point corresponding to the position of the object is given, this time point can be determined from this position of the axis of symmetry. Accordingly, the shift time Δd does not necessarily have to be determined to such a value that the position of the axis of symmetry of the rising peak waveform of the differential signal coincides with the time point corresponding to the position of the object.

Although the radar apparatus of the present invention has been described as being a vehicle-mounted radar apparatus in the above embodiment, the radar apparatus of the present invention can be used to detect intruders into a given area.

The above explained preferred embodiments are exemplary of the invention of the present application which is described solely by the claims appended below. It should be understood that modifications of the preferred embodiments may be made as would occur to one of skill in the art.

What is claimed is:

1. A radar apparatus comprising:
   a laser light emitting section successively emitting laser lights;
   a reflection light detecting section receiving, as reflection lights, said laser lights emitted by said laser light emitting section and reflected from an object, and generating light reception signals containing reflection signals respectively derived from said reflection lights and having signal levels depending on intensities of said reflection lights;
   an integrating section generating an integrated signal by integrating said light reception signals, said integrated signal containing said reflection signals being integrated;
   a phase shifted signal generating section generating a phase shifted signal by delaying said integrated signal by a predetermined time;
   a differential signal calculating section calculating, as a differential signal, a difference between said integrated signal and said phase-shifted signal; and
   a detector section detecting said object on the basis of a peak waveform of said differential signal caused by a rising edge of said reflection signals being integrated.

2. The radar apparatus according to claim 1, wherein said predetermined time is set at such a value that a position on a time axis of a center axis of said peak waveform of said differential signal coincides with a position on said time axis of a time point corresponding to a distance to said object.

3. The radar apparatus according to claim 2, wherein said detector section calculates an elapsed time between a moment of emission of said laser light and a mid-point between a rising intersection and a falling intersection between said peak waveform and a predetermined threshold line, and determines said distance to said object on the basis of said calculated elapsed time.

4. The radar apparatus according to claim 1, further comprising a saturation judging section judging whether or not a peak waveform of said integrated signal is saturated or not, said detector section being configured to detect said object on the basis of said peak waveform of said differential signal when said saturation judging section judges that said peak waveform of said integrated signal is saturated, and detect said object on the basis of said peak waveform of said differential signal when said saturation judging section judges that said peak waveform of said integrated signal is not saturated.

5. A radar apparatus comprising:
   a laser light emitting section emitting a laser light;
   a reflection light detecting section receiving, as a reflection light, said laser light emitted by said laser light emitting section and reflected from an object, and generating a light reception signal containing a reflection signal derived from said reflection light and having a signal level depending on an intensity of said reflection light;

a differential signal calculating section calculating, as a differential signal, a difference between a first signal derived from said light reception signal and being in phase with said light reception signal and a second signal derived said light reception signal and being out of phase with said light reception signal; and a detector section detecting said object on the basis of a peak waveform of said differential signal caused by a rising edge of said reflection signal.

6. The radar apparatus according to claim 5, wherein said differential signal calculating section includes an integrating section generating, as said first signal, an integrated signal by integrating a plurality of said light reception signals containing a plurality of said reflection signals derived from a plurality of said reflection lights reflected from said object, said differential signal calculating section generating said second signal by delaying said integrated signal by a predetermined time.

7. The radar apparatus according to claim 6, wherein said predetermined time is set at such a value that a position on a time axis of a center axis of a peak waveform of said differential signal coincides with a position on said time axis of a time point corresponding to a distance to said object.

8. The radar apparatus according to claim 7, wherein said detector section calculates an elapsed time between a moment of emission of said laser light and a mid-point between a rising intersection and a falling intersection between said peak waveform and a predetermined threshold line, and determines a distance to said object on the basis of said calculated elapsed time.

9. The radar apparatus according to claim 6, further comprising a saturation judging section judging whether or not a peak waveform of said integrated signal is saturated or not, said detector section being configured to detect said object on the basis of said peak waveform of said differential signal when said saturation judging section judges that said peak waveform of said integrated signal is saturated, and detect said object on the basis of said peak waveform of said differential signal when said saturation judging section judges that said peak waveform of said integrated signal is not saturated.

* * * * *